(12) United States Patent
Narendra et al.

(10) Patent No.: US 7,620,119 B2
(45) Date of Patent: Nov. 17, 2009

(54) COMMUNICATIONS RECEIVER WITH DIGITAL COUNTER

(75) Inventors: Siva G. Narendra, Portland, OR (US);
Yatin Hoskote, Portland, OR (US);
Saurabh Dighe, Hillsboro, OR (US);
Nitin Y. Borkar, Portland, OR (US);
Vivek K De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 945 days.

(21) Appl. No.: 10/879,512

(22) Filed: Jun. 29, 2004

(65) Prior Publication Data

US 2005/0286655 A1 Dec. 29, 2005

(51) Int. Cl.
*H04L 27/14* (2006.01)
*H04B 1/18* (2006.01)

(52) U.S. Cl. .................................. 375/316; 455/158.3

(58) Field of Classification Search ......... 375/316–319, 375/326, 328, 351; 455/158.3, 194.2; 324/76.16, 324/76.48, 76.62; 327/151, 160, 241, 265, 327/273, 279, 286; 329/341; 361/4; 377/29, 377/49, 52, 88, 107, 108
See application file for complete search history.

(56) References Cited

U.S. PATENT DOCUMENTS

| | | | | | |
|---|---|---|---|---|---|
| 3,766,560 | A | * | 10/1973 | Bornhorst et al. | 342/428 |
| 4,353,099 | A | * | 10/1982 | Shum et al. | 360/27 |
| 4,471,354 | A | * | 9/1984 | Smith | 340/870.17 |
| 5,171,928 | A | * | 12/1992 | Kim | 84/609 |
| 5,280,404 | A | * | 1/1994 | Ragsdale | 361/113 |
| 5,799,043 | A | * | 8/1998 | Chang et al. | 375/286 |
| 2003/0007473 | A1 | * | 1/2003 | Strong et al. | 370/338 |
| 2004/0232965 | A1 | * | 11/2004 | Kuo et al. | 327/172 |

FOREIGN PATENT DOCUMENTS

GB 12039 0/1896

OTHER PUBLICATIONS

Kuhn, K., et al., "A 90 nm Communication Technology Featuring SiGe HBT Transistors, RF CMOS, Precision R-L-C RF Elements and 1um 6-T SRAM Cell", *Technical Digest International Electron Devices Meeting*, (2002),73-76.

* cited by examiner

*Primary Examiner*—Young T. Tse
(74) *Attorney, Agent, or Firm*—Dana B. Lemoine; Lemoine Patent Services, PLLC

(57) ABSTRACT

A communications receiver includes a digital counter to count transitions of a carrier signal subject to on/off keying.

14 Claims, 9 Drawing Sheets

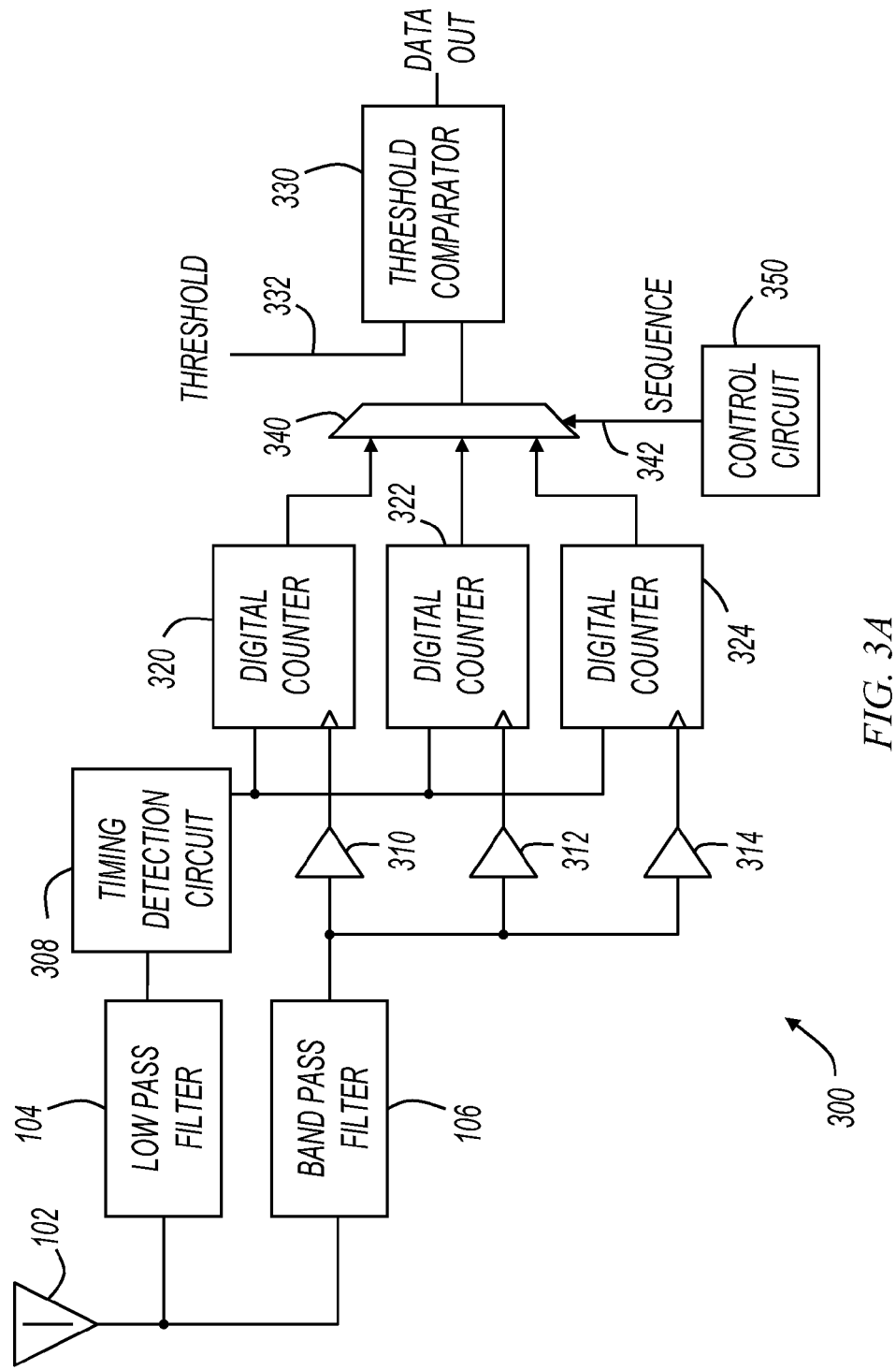

US 7,620,119 B2

COMMUNICATIONS RECEIVER WITH DIGITAL COUNTER

FIELD

The present invention relates generally to electronic circuits, and more specifically to communications receiver circuits.

BACKGROUND

Communications receivers may include many different types of circuits depending on the chosen modulation formats, frequencies of operations, power requirements and the like. Reducing the amount and types of circuits used in communications receivers may make them simpler to implement, smaller, and more power efficient.

BRIEF DESCRIPTION OF THE DRAWINGS

FIGS. 3A, 3B, 4, 5A and 5B show various embodiments of communications receivers that utilize digital counters;

DESCRIPTION OF EMBODIMENTS

Figure 1:
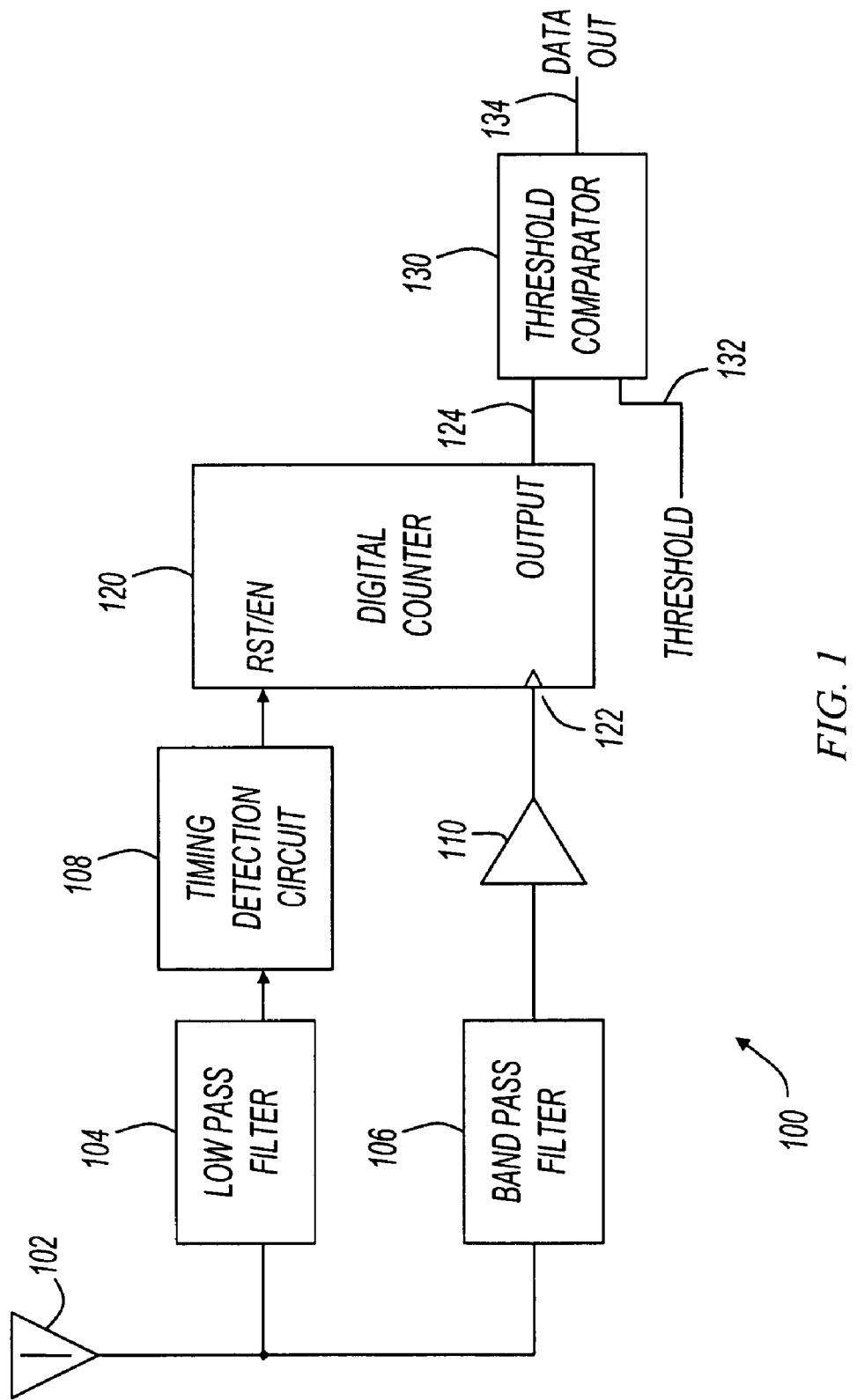
FIG. 1 shows a communications receiver that utilizes a digital counter.

In the following detailed description, reference is made to the accompanying drawings that show, by way of illustration, various embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a communications receiver with a digital counter. Receiver 100 includes low pass filter 104, timing detection circuit 108, band pass filter 106, amplifier 110, digital counter 120, and threshold comparator 130. Also shown in FIG. 1 is antenna 102.

Figure 2:
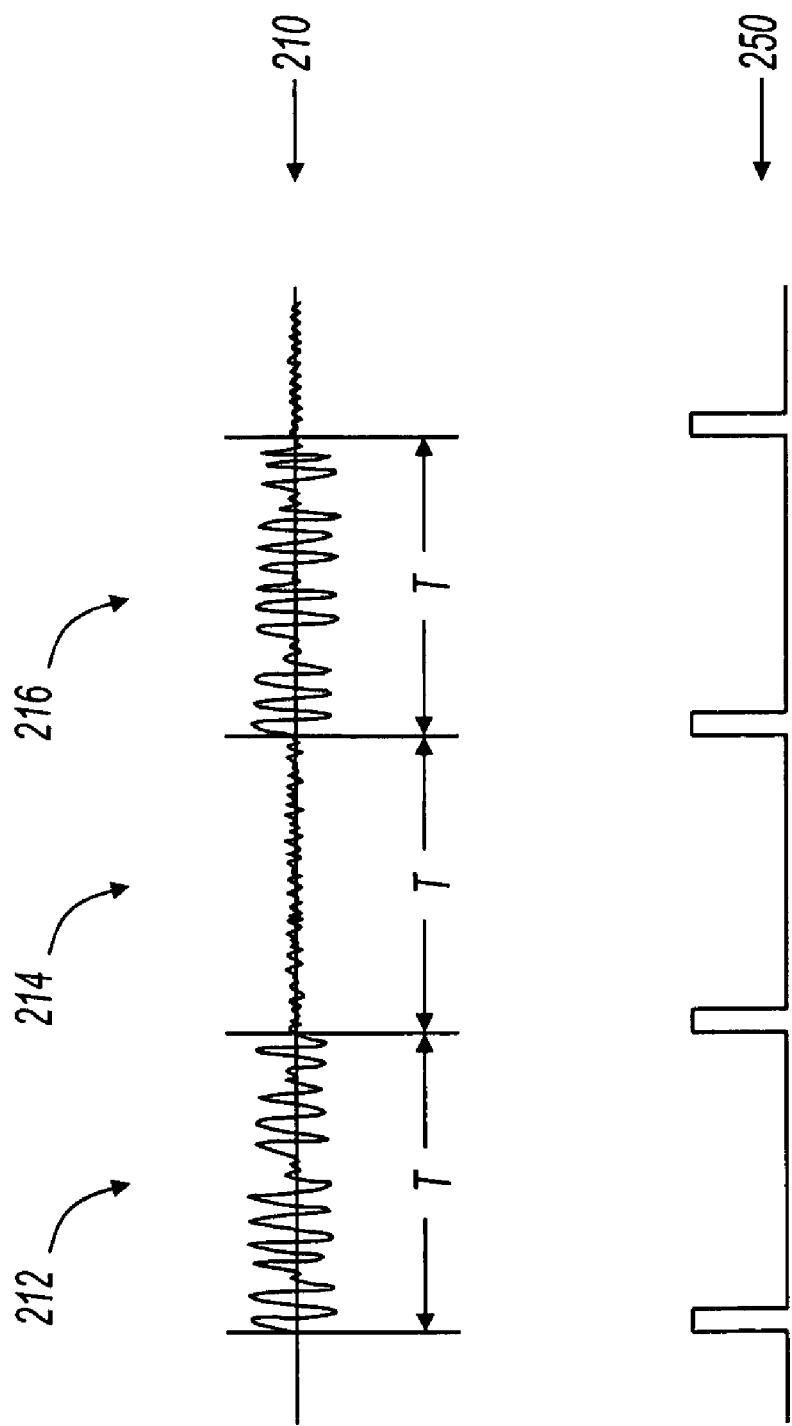
FIG. 2 shows an on/off keyed waveform.

In operation, digital counter 120 may decode an on/off keyed communications signal by counting transitions of a signal present at clock input 122. For example, referring now to FIG. 2, on/off keyed waveform 210 represents a signal that is characterized by a carrier signal at a particular frequency that is present when keyed on, and not present when keyed off. As shown in FIG. 2, waveform 210 is keyed on at 212 and 216, and is keyed off at 214. Each of these states (e.g., keyed on or off) may represent a digital bit of information. For example, a digital "1" may be represented when waveform 210 is keyed on, and a digital "0" may be represented when waveform 210 is keyed off.

Waveform 210 may be keyed on or off for a particular period of time, where the period of time, or "period," is related to the data rate of the underlying communications. For example, as shown in FIG. 2, each of 212, 214, and 216 last for a period of time equal to T. During each period, the carrier signal is either on or off, and is also subject to noise and attenuation due to channel effects prior to being received. For example, the carrier is keyed on at 212, and the signal is present, but it is somewhat corrupted due to noise and attenuation. Also for example, the carrier is keyed off at 214, but appears as non-zero because of the effects in the channel.

Referring now back to FIG. 1, antenna 102 may receive a communications signal similar to waveform 210 (FIG. 2). Band pass filter 106 applies a filter to the received communications signal to reject unwanted spectral energy, and the resulting signal is amplified by amplifier 110. An output signal from amplifier 110 is presented to clock input 122 of digital counter 120, and digital counter 120 counts transitions of the resulting signal. By comparing the number of detected transitions during a time period with a threshold using threshold comparator 130, receiver 100 may detect whether the communications signal is keyed on or off for any particular period.

Band pass filter 106 may allow signals of various bandwidths to pass on to amplifier 110. For example, in some embodiments, band pass filter 106 may be a narrow band filter to allow signal energy associated with a single carrier frequency to pass. In some of these embodiments, band pass filter 106 may have a center frequency of five gigahertz (GHz), with sharp roll-off above and below 5 GHz. Also for example, in some embodiments, band pass filter 106 may be a broad band filter to allow signal energy associated with multiple carrier frequencies to pass. In some of these embodiments, band pass filter 106 may have a pass band of between substantially 3.1 GHz and 10.6 GHz. These frequency values are provided for illustrative purposes only, and the present invention is not limited in this respect.

Like band pass filter 106, amplifier 110 may amplify signals of various bandwidths. For example, in some embodiments, amplifier 110 may be a broadband amplifier (also referred to as an "untuned" amplifier) that provides signal amplification over a wide bandwidth, and in other embodiments, amplifier 110 may be a narrowband amplifier (also referred to as a "tuned" amplifier) that provides signal amplification over a narrower bandwidth. In some embodiments, amplifier 110 may be an amplifier that amplifies signal energy over the entire bandwidth of band pass filter 106, and in other embodiments, amplifier 110 may be an amplifier that amplifies signal energy over a bandwidth that is narrower than the entire bandwidth of band pass filter 106.

In some embodiments, amplifier 110 is a saturating amplifier that provides a rail-to-rail output signal that switches when the input voltage crosses a threshold. In these embodiments, the output of amplifier 110 appears substantially as a digital signal to drive clock input 122 of digital counter 120. In other embodiments, amplifier 110 is a linear amplifier that amplifies the input signal substantially as received. In these embodiments, digital counter 120 responds to transitions that swing past a voltage threshold corresponding to the logic threshold on the clock input node of digital counter 120.

Low pass filter 104 also receives the on/off keyed communications signal from antenna 102. In some embodiments, low pass filter 104 provides timing detection circuit 108 with a signal that is related to the data rate of the on/off keyed communications signal. For example, low pass filter 104 may produce a signal having a fundamental frequency equal to two times the data rate of the on/off keyed communications signal.

Timing detection circuit 108 receives a signal from low pass filter 104 and performs various amounts of signal processing. For example, timing detection circuit 108 may include one or more phase locked loops (PLL), frequency dividers, or the like. In some embodiments, timing detection circuit 108 may produce one or more signals similar to waveform 250 (FIG. 2). Waveform 250 may be used to reset digital counter 120 at the beginning of each period. Waveform 250, or a similar waveform, may also be provided to threshold comparator 130 to set a point in time at which a threshold comparison is made. Waveform 250 is provided in FIG. 2 as an example, and timing detection circuit 108 is not limited to producing only waveform 250. For example, timing detection circuit 108 may produce reset signals, enable signals, or any other signal derivable from an incoming on/off keyed communications signal.

Threshold comparator 130 receives a count value from digital counter 120 on node 124 and a threshold value on node 132. When the count value is above the threshold value, threshold comparator 130 drives a "1" on node 134, and when the count value is below the threshold value, threshold comparator 130 drives a "0" on node 134. The count value on node 124 may be any number of digital bits, and the threshold value on node 132 may also be any number of digital bits. For example, digital counter 120 may have an output of seven bits, allowing counter 120 to count up to 128 transitions in a period, or digital counter 120 may have an output of eight bits, allowing digital counter 120 to count up to 256 transitions in a period.

The number of bits used for digital counter 120 and the threshold value may be chosen based on the carrier frequencies and data rates. For example, a 5 GHz carrier with 100 Megabit per second (Mbs) data rate may count 50 transitions of a carrier signal during one period under noiseless conditions. In these embodiments, a counter output of six bits allows the digital counter to count up to 64.

The threshold value on node 132 may be held in a register (not shown) and may be set by a variety of different types of mechanisms. For example, in some embodiments, a processor may set the value of the threshold based on various criteria. These criteria may include the carrier frequency, the data rate, the noise in the channel, or the like. For example, in some embodiments, a training sequence is received that includes a known digital sequence, and a threshold value is determined by examining the number of transitions detected in each period.

Receiver 100 may have many different uses. For example, in some embodiments, receiver 100 may receive Ultra Wide Band (UWB) based wireless transmissions. In some embodiments, receiver 100 may receive UWB signals at frequencies of 3.1 to 10.6 GHz at or below substantially −41.25 dBm.

In some embodiments, digital counter 120 may be implemented using a fast complementary metal oxide semiconductor (CMOS) process that utilizes metal oxide semiconductor field effect transistors (MOSFETs). As silicon MOSFETs are built ever smaller, maximum operating frequencies (fmax) are reaching tens of GHz and beyond. Using these advanced technologies, a CMOS digital counter may be used to build UWB systems that are simple, low cost, and low power.

Figure 3B:
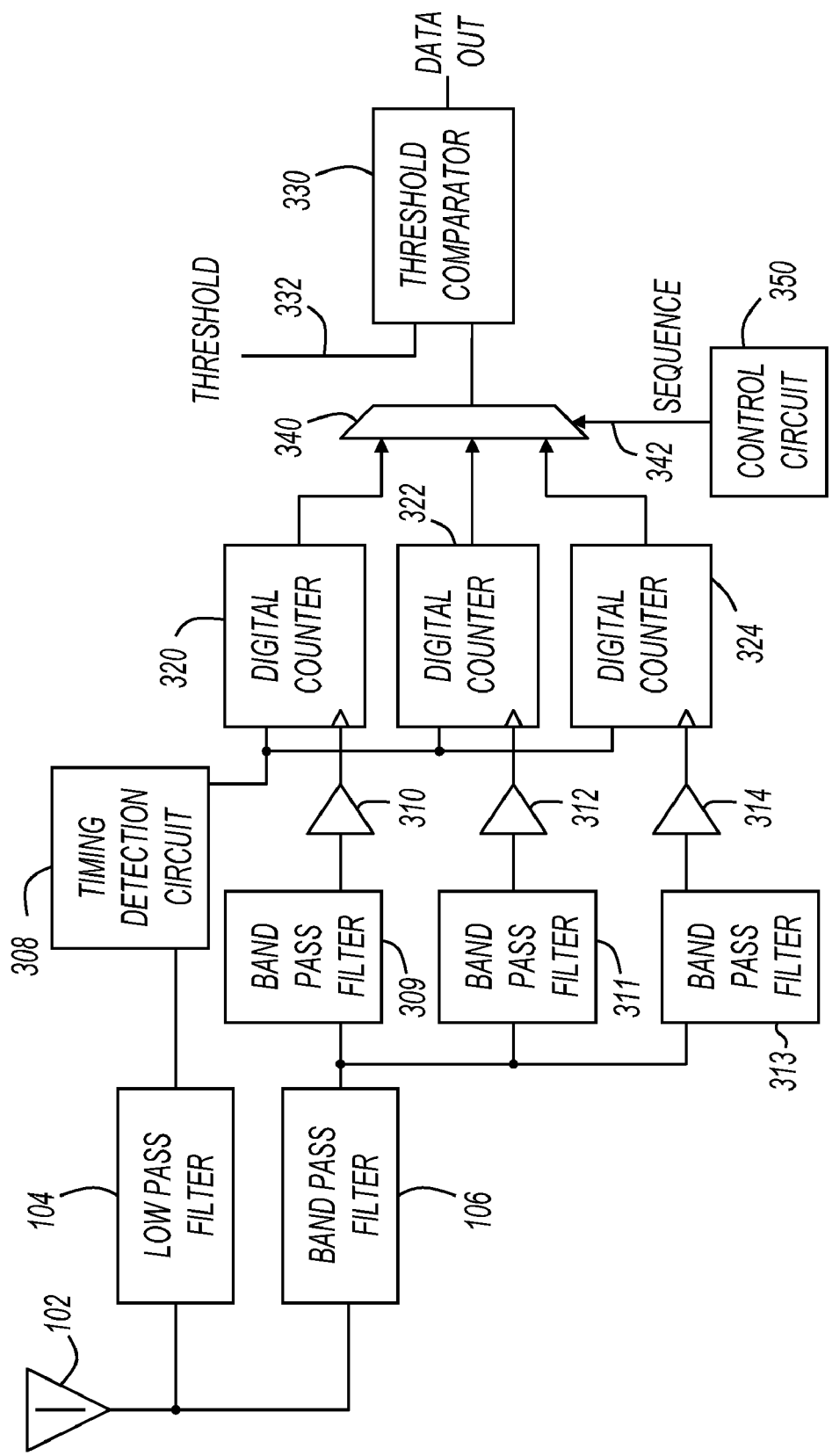

FIG. 3A shows a communications receiver that includes multiple digital counters. Receiver 300 includes low pass filter 104, band pass filter 106, and timing detection circuit 308. Receiver 300 also includes amplifiers 310, 312, and 314, digital counters 320, 322, and 324, multiplexer 340, threshold comparator 330, and control circuit 350.

In some embodiments, amplifiers 310, 312, and 314 are each tuned to a separate carrier frequency. For example, band pass filter 106 may pass frequencies within substantially 3.1 GHz and 10.6 GHz, and each of amplifiers 310, 312, and 314 may be tuned to amplify different carrier frequencies within the pass band of band pass filter 106. FIG. 3 shows three tuned amplifiers coupled between band pass filter 106 and three digital counters. In some embodiments, more than three amplifiers and more than three digital counters are utilized. By utilizing more amplifiers and more digital counters, more individual carrier frequencies may be selected for detecting transitions.

In other embodiments, amplifiers 310, 312, and 314 are each untuned amplifiers, and separate band pass filters are included in the signal paths prior to the amplifiers 310, 312, and 314. For example, referring to FIG. 3B, a first band pass filter 309 having a first band pass response may be coupled at the input to amplifier 310, a second band pass filter 311 having a second band pass response may be coupled at the input to amplifier 312, and a third band pass filter 313 having a third band pass response may be coupled at the input to amplifier 314.

Digital counters 320, 322, and 324 count transitions of signals amplified by amplifiers 310, 312, and 314, respectively. Each of the digital counters provides a digital count output to multiplexer 340. Multiplexer 340 selects a digital counter output to provide to threshold comparator 330 for comparison with the threshold value on node 332. Multiplexer 340 provides the selection in response to the sequence value driven on node 342 by control circuit 350. In some embodiments, the sequence value changes in a manner that corresponds to changing carrier frequencies. For example, in some embodiments an on/off keyed communications signal may utilize multiple carrier frequencies in a time a multiplexed fashion. In these embodiments, control circuit 350 may change the sequence value in the same time multiplexed fashion so as to provide the counter output corresponding to the received frequency to threshold comparator 330. Further, in some embodiments, the threshold value on node 332 may also change in the same time multiplexed fashion.

In some embodiments, the sequence value on node 342 may correspond to a predetermined sequence known to both transmitters and receivers. The predetermined sequence may be generated by control circuit 350 in many different ways, including, for example, by tables of values, linear feedback shift registers, or the like. In some embodiments, control circuit 350 includes a processor or state machine. The manner in which control circuit 350 is implemented is not a limitation of the present invention.

Timing detection circuit 308 may perform operations similar to timing detection circuit 108 (FIG. 1). In addition, timing detection circuit 308 may include additional circuitry to perform further operations in support of the multiple digital counters in receiver 300. For example, in some embodiments, timing detection circuit 308 may only enable the digital counter corresponding to the selected output as specified by the sequence value on node 342.

Figure 4:
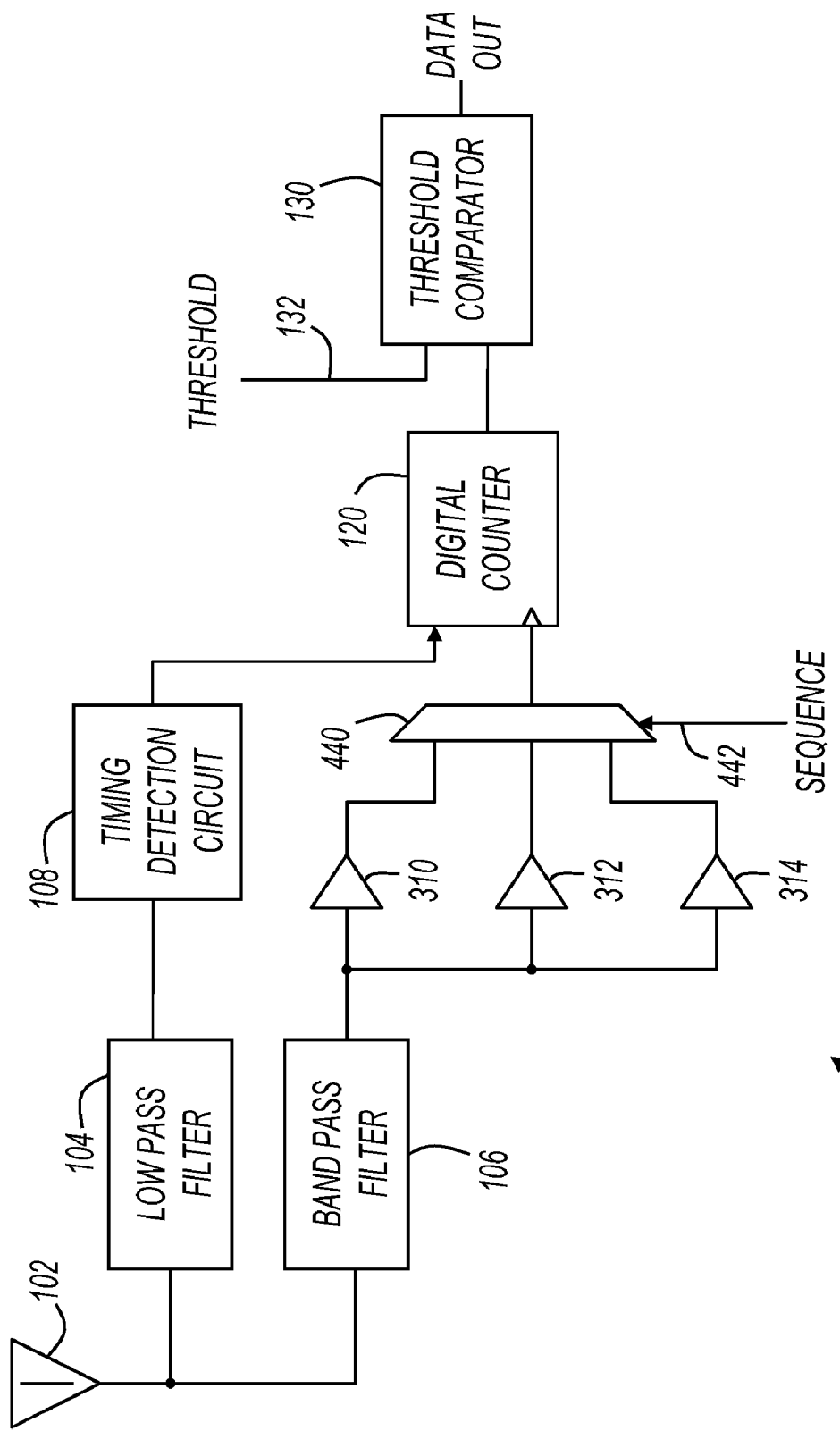

FIG. 4 shows a communications receiver in accordance with various embodiments of the present invention. Receiver 400 includes low pass filter 104, band pass filter 106, timing detection circuit 108, digital counter 120, and threshold comparator 130, all of which are described above with reference to FIG. 1. Receiver 400 also includes amplifiers 310, 312, and 314, which are described above with reference to FIG. 3A. Receiver 400 also includes multiplexing device 440. In embodiments represented by FIG. 4, a received signal may be time multiplexed between different carrier frequencies, and a single digital counter may be utilized by selecting an amplifier output using multiplexing device 440. In some embodiments, multiplexing device 440 may include an analog multiplexer that utilizes analog switches such as transistors, diodes, or the like.

The sequence value on node 442 may sequence through values as described above with reference to FIG. 3A. Further, threshold values on node 132 may also sequence through threshold values that correspond to different carrier frequencies as described above with reference to FIG. 3A. In some embodiments, the sequence value on node 442 and the threshold value on node 132 may be generated by a control circuit such as control circuit 350 (FIG. 3A), or may be digital values held in registers. For example, a processor coupled to receiver 400, or a processor that is part of receiver 400, may set sequence values and threshold values directly, or may influence the setting of sequence values and threshold values indirectly. The manner in which sequence values and threshold values are set is not a limitation of the present invention.

Figure 5A:
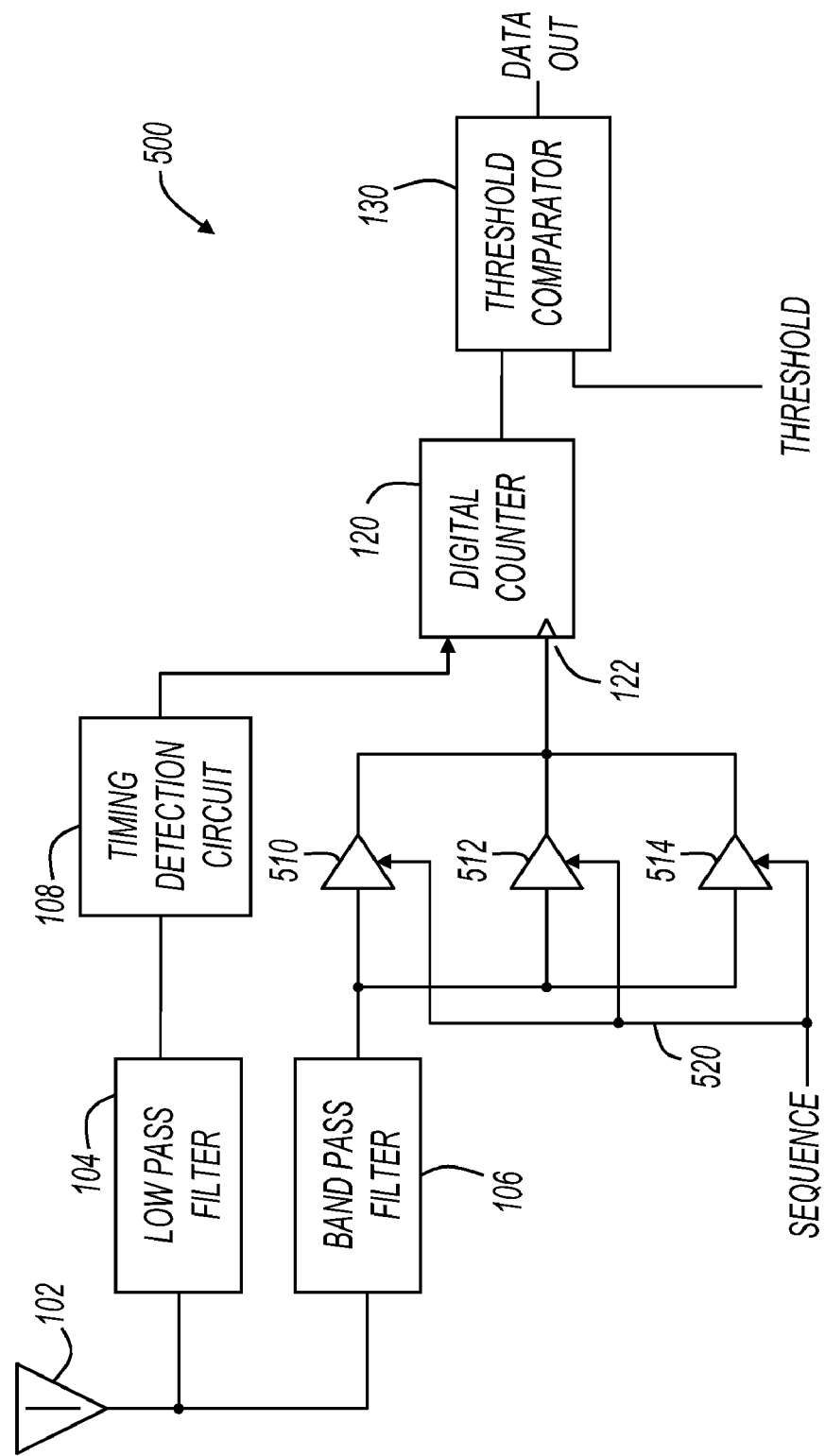
Figure 5B:
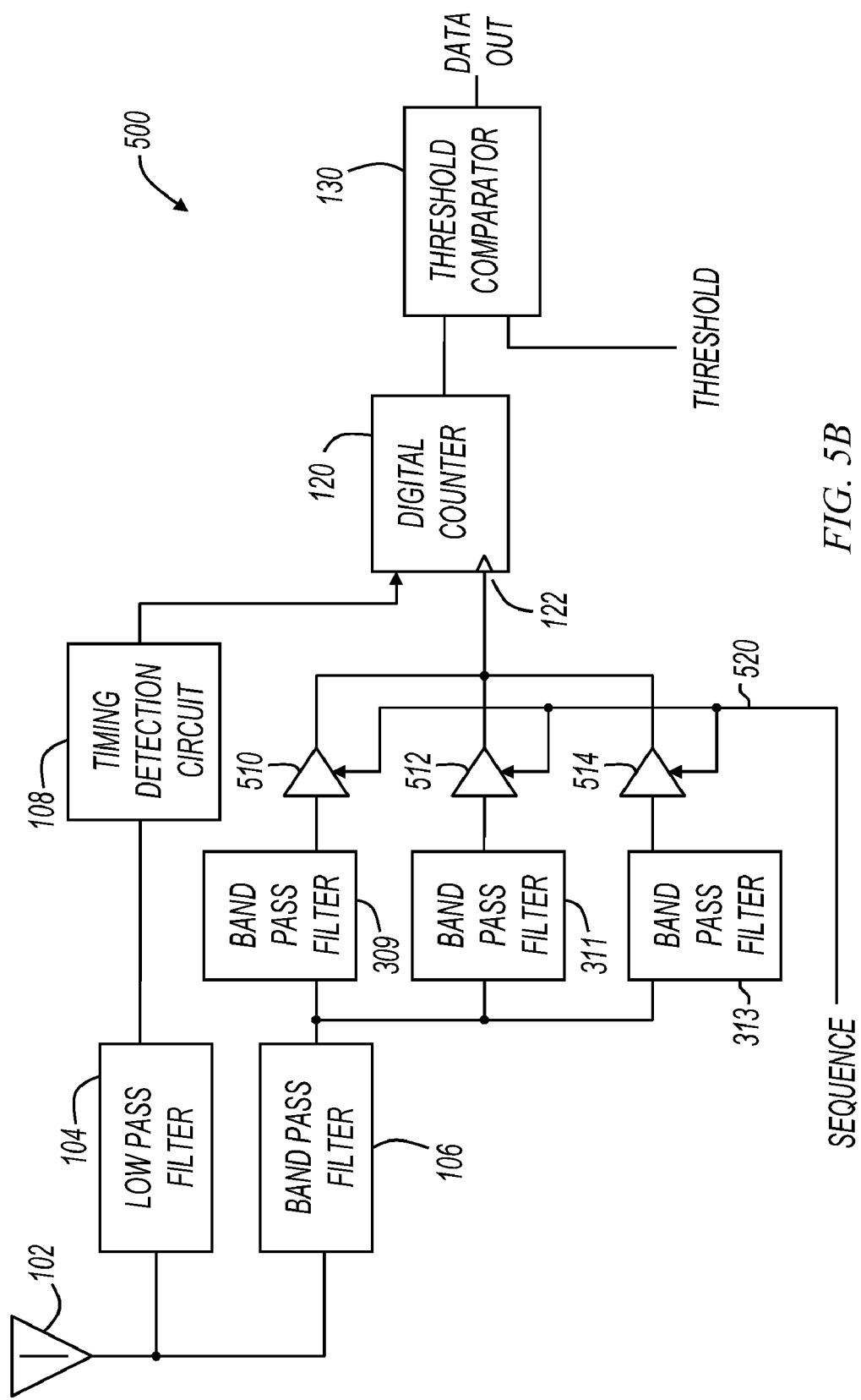

FIG. 5A shows a communications receiver in accordance with various embodiments of the present invention. Receiver 500 includes low pass filter 104, band pass filter 106, timing detection circuit 108, digital counter 120, and threshold comparator 130, all of which are described above with reference to FIG. 1. Receiver 500 also includes amplifiers 510, 512, and 514. In embodiments represented by FIG. 5, a received signal may be time multiplexed between different carrier frequencies, and a single digital counter may be utilized by selecting an amplifier output from amplifiers 510, 512, and 514.

Amplifiers 510, 512, and 514 have output nodes coupled in common. In some embodiments, amplifiers 510, 512, and 514 include output controls or output circuitry that allow each amplifier's output node to be put in a high impedance state. A high impedance state of the various amplifiers may be controlled by the sequence value on node 520. The output nodes coupled in common form a multiplexing device. For example, clock input 122 of digital counter 120 may receive an output signal from any of amplifiers 510, 512, or 514 based on the sequence value on node 520. As described with reference to the previous figures, the sequence value and the threshold value may be modified in any manner suitable to detect the state of the communications signal that varies in carrier frequency.

In some embodiments, amplifiers 510, 512, and 514 are each tuned to a separate carrier frequency. For example, band pass filter 106 may pass frequencies within substantially 3.1 GHz and 10.6 GHz, and each of amplifiers 510, 512, and 514 may be tuned to amplify different carrier frequencies within the pass band of band pass filter 106. FIG. 5A shows three tuned amplifiers coupled between band pass filter 106 and one digital counter. In some embodiments, more than three amplifiers and more than one digital counter are utilized. By utilizing more amplifiers and more digital counters, more individual carrier frequencies may be selected for detecting transitions.

In other embodiments, amplifiers 510, 512, and 514 are each untuned amplifiers, and separate band pass filters are included in the signal paths prior to the amplifiers 510, 512, and 514. For example, referring to FIG. 5B, a first band pass filter 309 having a first band pass response may be coupled at the input to amplifier 510, a second band pass filter 311 having a second band pass response may be coupled at the input to amplifier 512, and a third band pass filter 313 having a third band pass response may be coupled at the input to amplifier 514.

Figure 6:
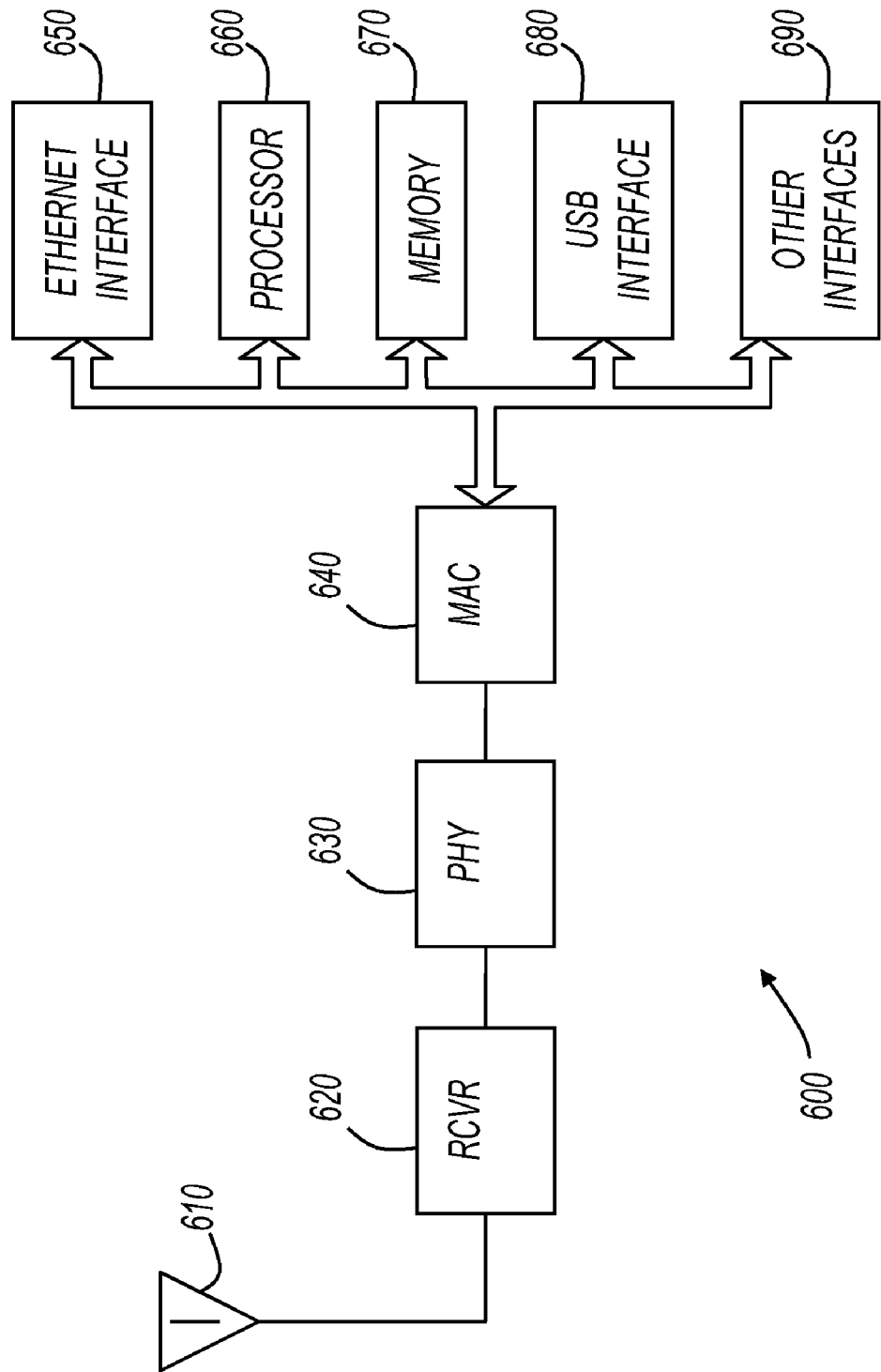
FIG. 6 shows a system diagram in accordance with various embodiments of the present invention.

FIG. 6 shows a system diagram in accordance with various embodiments of the present invention. Electronic system 600 includes antenna 610, receiver 620, physical layer (PHY) 630, media access control (MAC) mechanism 640, processor 660, memory 670, Ethernet interface 650, universal serial bus (USB) interface 680, and other interfaces 690. In some embodiments, electronic system 600 may be part of a system that communicates using on/off keyed communications signals. For example, in some embodiments, electronic system 600 may be part of a wireless network interface that communicates using on/off keyed communications signals in a spectrum that is compatible with UWB systems.

In some embodiments, electronic system 600 may represent a system that includes a wireless interface as well as other circuits. For example, in some embodiments, electronic system 600 may be a computer, such as a personal computer, a workstation, or the like, that includes a network interface as a peripheral or as an integrated unit. Further, electronic system 600 may represent a network interface card (NIC) usable in a mobile station within a wireless network, or may represent a wireless interface usable in an access point within a wireless network.

Antenna 610 may be a directional antenna or an omni-directional antenna. As used herein, the term omni-directional antenna refers to any antenna having a substantially uniform pattern in at least one plane. For example, in some embodiments, antenna 610 may be an omni-directional antenna such as a dipole antenna, or a quarter wave antenna. Also for example, in some embodiments, antenna 610 may be a directional antenna such as a parabolic dish antenna or a Yagi antenna. In still further embodiments, antenna 610 includes multiple physical antennas.

In operation, system 600 receives signals using antenna 610, and the signals are processed by the various elements shown in FIG. 6. Receiver 620 is coupled to antenna 610 to receive signals. In some embodiments, electronic system 600 may include circuitry to support the transmission and reception of radio frequency (RF) signals. For example, in some embodiments, a transmitter is included along with receiver 620 to transmit and receive on/off keyed communications signals. The various embodiments of the invention are not limited by the contents or function of receiver 620.

Physical layer (PHY) 630 may be any suitable physical layer implementation. For example, PHY 630 may be a circuit block that implements a physical layer that complies with a standard for operation in a UWB network, or other standard. PHY 630 may implement coding and decoding, interleaving and deinterleaving, error correction, and the like. The various embodiments of the present invention are not limited by the contents or function of PHY 630.

Media access control (MAC) mechanism 640 may be any suitable media access control layer implementation. For example, MAC 640 may be implemented in software, or hardware or any combination thereof. In some embodiments, a portion of MAC 640 may be implemented in hardware, and a portion may be implemented in software that is executed by processor 660. Further, MAC 640 may include a processor separate from processor 660.

Processor 660 may perform method embodiments of the present invention, such as method 700 (FIG. 7) by influencing the operation of various hardware components. Processor 660 may also control sequence values and threshold values as described above. Processor 660 represents any type of processor, including but not limited to, a microprocessor, a digital signal processor, a microcontroller, or the like.

Memory 670 represents an article that includes a machine readable medium. For example, memory 670 represents a random access memory (RAM), dynamic random access memory (DRAM), static random access memory (SRAM), read only memory (ROM), flash memory, or any other type of article that includes a medium readable by processor 660. Memory 670 may store instructions for performing the execution of the various method embodiments of the present invention.

Ethernet interface 650, USB interface 680, and other interfaces 690 may provide communications between electronic system 600 and other systems. For example, in some embodiments, electronic system 600 may be an access point in a wireless network that utilizes Ethernet interface 650, USB interface 680, or other interfaces 690 to communicate with a wired network or to communicate with other access points. Some embodiments of the present invention do not include Ethernet interface 650. For example, in some embodiments, electronic system 600 may be a network interface card (NIC) that communicates with a computer or network using a bus or other type of port.

Figure 7:
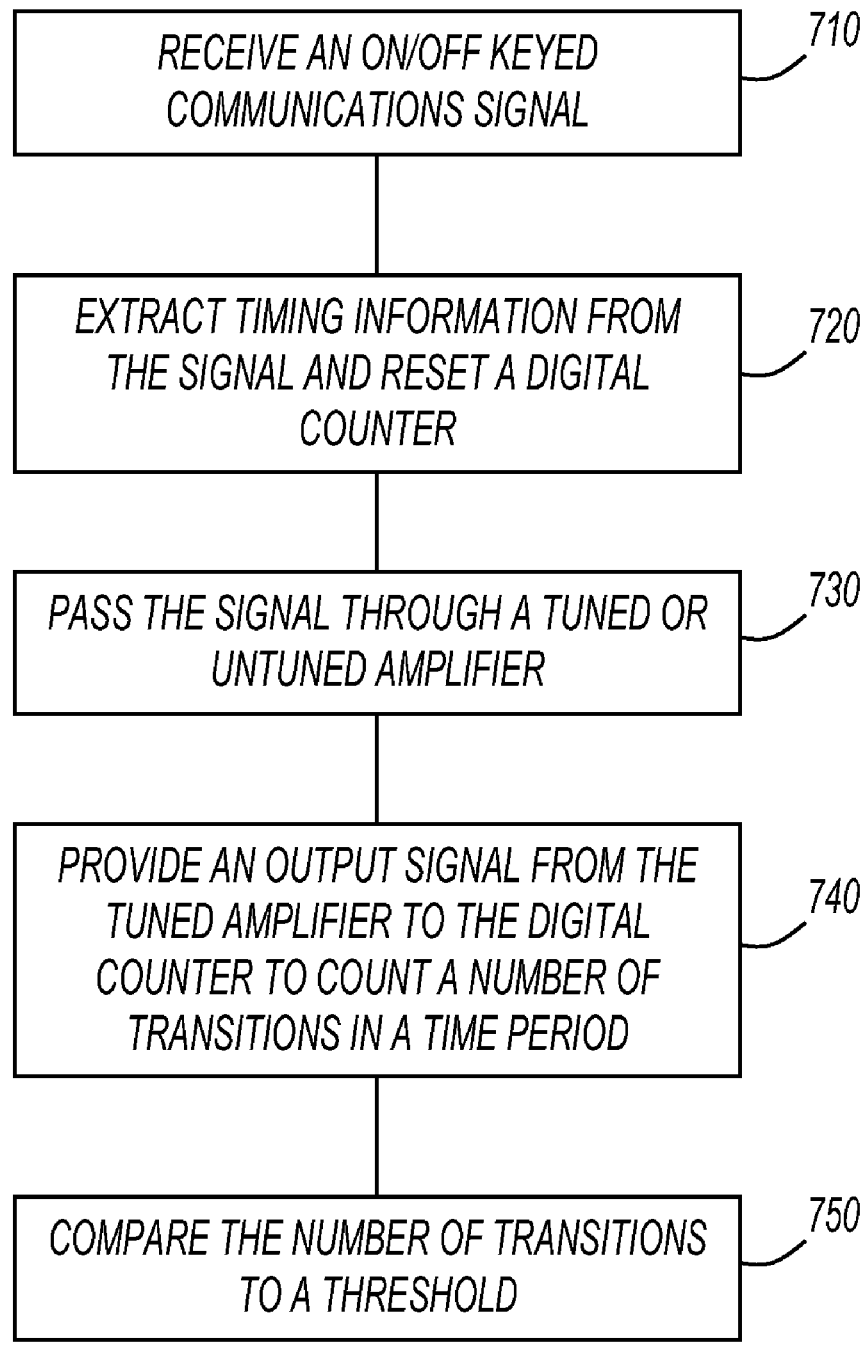
FIG. 7 shows a flowchart in accordance with various embodiments of the present invention.

FIG. 7 shows a flowchart in accordance with various embodiments of the present invention. In some embodiments, method 700, or portions thereof, is performed by a communications receiver, embodiments of which are shown in previous figures. In other embodiments, method 700 is performed by a control circuit, an integrated circuit, or an electronic system. Method 700 is not limited by the particular type of apparatus performing the method. The various actions in method 700 may be performed in the order presented, or may be performed in a different order. Further, in some embodiments, some actions listed in FIG. 7 are omitted from method 700.

Method 700 is shown beginning with block 710 in which an on/off keyed communications signal is received. In some embodiments, the on/off keyed signal includes a carrier frequency between substantially 3.1 GHz and 10.6 GHz, but this is not a limitation of the present invention. At 720, timing information is extracted from the signal, and a digital counter is reset. In some embodiments, this may correspond to timing detection circuit 108 (FIG. 1) or timing detection circuit 308 (FIG. 3A) extracting timing information from the received signal and providing a reset signal to the appropriate digital counter(s) at the appropriate time(s).

At 730, the signal is passed through a tuned or untuned amplifier. For example, an untuned amplifier of 730 may be the only amplifier included within a receiver, such as amplifier 110 (FIG. 1). Further a tuned amplifier of 730 may be one of many amplifiers included in a receiver. For example, the amplifier may be one of many amplifiers tuned to a different carrier frequency, such as those shown and described with reference to FIGS. 3A, 4, and 5A.

At 740, an output signal from the tuned amplifier is provided to the digital counter to count the number of transitions in a time period. In some embodiments, the output signal from the tuned amplifier is provided directly to a clock input of a digital counter such as in embodiments represented by FIGS. 1, 3A, and 3B. In other embodiments, the output of the tuned amplifier is one of many outputs selected using a multiplexing mechanism to provide the output signal to the digital counter. For example, various embodiments of multiplexing mechanisms are described with reference to FIGS. 4, 5A, and 5B. The counter may be manufactured using any type of process. For example, in some embodiments, the digital counter may be manufactured using a CMOS process.

At 750, the number of transitions is compared with threshold. The threshold may be a fixed threshold, or may be a threshold that varies based on various criteria. For example, the threshold may vary based on a particular sequence of carrier frequencies, or may vary based on the noise in the channel.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   receiving an on/off keyed communications signal;
   providing the on/off keyed communications signal to a digital counter to count a number of transitions in a period ; and
   comparing the number of transitions to a threshold;
   wherein providing the signal to the digital counter comprises passing the signal through a plurality of tuned amplifiers, selecting one output signal from the plurality of tuned amplifiers, and providing the one output signal to the digital counter.

2. The method of claim 1 wherein providing the one output signal to the digital counter comprises driving a clock input of the digital counter with the one output signal.

3. The method of claim 1 wherein selecting one output signal from the plurality of tuned amplifiers comprises sequencing through the plurality of tuned amplifiers.

4. An apparatus comprising:
   a plurality of amplifiers to receive a communications signal;
   a multiplexing device to select one output signal from the plurality of amplifiers; and
   a counter to count transitions in the one output signal;
   wherein each of the plurality of amplifiers is tuned to a separate carrier frequency.

5. The apparatus of claim 4 wherein the multiplexing device comprises output controls on the plurality of amplifiers.

6. The apparatus of claim 4 wherein the multiplexing device comprises an analog multiplexer.

7. The apparatus of claim 4 further comprising a control circuit to switch the multiplexing device in a predetermined sequence.

8. The apparatus of claim 4 wherein the plurality of amplifiers are tuned to frequencies between substantially 3.1 GHz and 10.6 GHz.

9. The apparatus of claim 4 further comprising a plurality of band pass filters coupled to provide the plurality of amplifiers with band pass signals.

10. An apparatus comprising:
    a plurality of amplifiers to receive a communications signal;
    a multiplexing device to select one output signal from the plurality of amplifiers; and
    a counter to count transitions in the one output signal;
    wherein the plurality of amplifiers are tuned to frequencies between substantially 3.1 GHz and 10.6 GHz.

11. The apparatus of claim 10 wherein the multiplexing device comprises output controls on the plurality of amplifiers.

12. The apparatus of claim 10 wherein the multiplexing device comprises an analog multiplexer.

13. The apparatus of claim 10 further comprising a control circuit to switch the multiplexing device in a predetermined sequence.

14. The apparatus of claim 10 further comprising a plurality of band pass filters coupled to provide the plurality of amplifiers with band pass signals.

* * * * *